| [19] | United States Patent | [11] | 4,260,713 |
|---|---|---|---|
| | Tanaka et al. | [45] | Apr. 7, 1981 |

[54] PROCESS FOR PRODUCING WATER-SOLUBLE POLYMERS

[75] Inventors: Motoaki Tanaka, Urawa; Tsutomu Miyagawa; Takashi Nakata, both of Kawagoe, all of Japan

[73] Assignee: Wako Pure Chemical Industries, Ltd., Osaka, Japan

[21] Appl. No.: 28,190

[22] Filed: Apr. 9, 1979

[30] Foreign Application Priority Data

Apr. 8, 1978 [JP] Japan .................. 53-41568

[51] Int. Cl.³ .................. C08F 4/04; C08F 120/54
[52] U.S. Cl. .................. 526/215; 526/204; 526/209; 526/218; 526/219; 526/292; 526/303
[58] Field of Search .............. 526/204, 218, 219, 209, 526/215

[56] References Cited

U.S. PATENT DOCUMENTS

| 3,428,618 | 2/1969 | Cook et al. ..................... 526/204 |
|---|---|---|
| 3,951,934 | 4/1976 | Ohshima et al. .................. 526/215 |

FOREIGN PATENT DOCUMENTS 4985174 8/1974 Japan .

OTHER PUBLICATIONS

Hammond et al., "Decomposition of Azobisamidines" 5-20-63 J. Am. Chem. Soc. 1501–1508.

Primary Examiner—Joseph L. Schofer
Assistant Examiner—Herbert J. Lilling
Attorney, Agent, or Firm—Armstrong, Nikaido, Marmelstein & Kubovcik

[57] ABSTRACT

Water-soluble polymers having high molecular weight with little branching and good water solubility, particularly acrylamide series polymers having excellent flocculation effect can be obtained when 2,2'-azobis-(N,N'-dimethyleneisobutylamidine) or an acid addition salt thereof or a mixture of 2,2'-azobis(N,N'-dimethyleneisobutylamidine) or an acid addition salt thereof and another azo compound is used as polymerization initiator.

5 Claims, No Drawings

PROCESS FOR PRODUCING WATER-SOLUBLE POLYMERS

This invention relates to a process for producing water-soluble polymers, particularly acrylamide series polymers.

Water-soluble polymers are useful as flocculating agents, paper strength boosters, fiber treating agents, adhesives, and the like. For example, acrylamide series polymers are useful as flocculating agents. Water-soluble polymers generally have been produced by polymerization in aqueous solutions, since water is a good solvent for both monomers and polymers produced. But such polymer solutions have too high viscosity to be stirred and cooled and remarkable temperature rise takes place during the polymerization procedure. Therefore, as polymerization initiators which can generate radicals in a wide temperature range, redox initiators have been used. But there have been various problems in using redox initiators in that a redox initiator component reacts with a polymer to form cross-linking during polymerization and drying of polymer solution, a reducing agent causes induced decomposition so as to discontinue the effect of the initiator and to retain unreacted monomers, and the like. In order to solve these problems, various studies have been made, but since these studies used redox initiators together with other polymerization initiators, these problems could not be solved essentially due to the use of redox initiators.

It is an object of this invention to provide a process for producing water-soluble polymers solving these problems mentioned above without using redox initiators.

This invention provides a process for producing a water-soluble polymer which comprises polymerizing a water-soluble monomer by using as a polymerization initiator 2,2'-azobis(N,N'-dimethyleneisobutyramidine) or an acid addition salt thereof or a mixture of 2,2'-azobis(N,N'-dimethyleneisobutylamidine) or an acid addition salt thereof and another azo compound.

According to this invention, since decomposition rate of 2,2'-azobis(N,N'-dimethyleneisobutylamidine) (hereinafter referred to as "ADIA") or an acid addition salt thereof used as polymerization initiator is fast, ADIA or an acid addition salt thereof can be used alone for low temperature polymerization as in the case of redox initiators.

On the other hand, in the production of water-soluble polymers in an aqueous solution, it is generally preferable to make a water content in the aqueous solution of polymer as low as possible in order to reduce costs in drying and transportation and plant capacity, etc. But since higher solid content in the polymer solution makes the final temperature higher, the presence of a polymerization initiator which can generate radicals at high temperatures becomes preferable. Although peroxides can generate radicals at high temperatures, they are not preferable as in the case of redox initiators due to the formation of crosslinking together with the polymer. In order to avoid such disadvantages, the use of azo compounds together with ADIA or its acid addition salt is preferable. Features of azo compounds having little chain transfer and no induced decomposition coupled with features of ADIA or acid addition salt thereof result in showing excellent properties in polymerization of a water-soluble monomer.

In order to form acid addition salts of ADIA, there can be used inorganic acids (or mineral acids) such as hydrochloric acid, sulfuric acid, etc., and organic acids such as acetic acid, propionic acid, benzoic acid, etc.

As azo compounds used together with ADIA or its acid addition salt, there can be used 2,2'-azobis(2-amidinopropane), 1,1'-azobis(1-amidino-1-cyclopropylethane), 2,2'-azobis(2-amidino-4-methylpentane), 1,1'-azobis(1-amidino-1-cyclohexylethane), 2,2'-azobis(1-imino-1-ethylamino-2-methylpropane), 2,2'-azobis-(1-allylamino-1-imino-2-methylbutane), 2,2'-azobis-(1-imino-1-cyclohexylamino-2-cyclohexylpropane), 2,2'-azobis(1-imino-1-laurylamino-2-ethylpropane), 2,2'-azobis(1-imino-1-phenylamino-2,4-dimethylpentane), 2,2'-azobis(1-imino-1-benzylamino-2-cyclopentylpropane), 2,2'-azobis(1-imino-1-parachlorobenzylamino-2-methyl-butane), and the like and acid addition salts thereof; 2,2'-azobis(N,N'-dimethylene-2-cyclopropylpropioamidine), 2,2'-azobis(N,N'-dimethyleneisopentylamidine), 2,2'-azobis(N,N'-dimethylene-2,4-dimethylpentylamidine), 2,2'-azobis(N,N'-dimethylene-2-methyl-3-cyclopropylpropioamidine), 2,2'-azobis(N,N'-dimethyleneisoheptylamidine), 2,2'-azobis(N,N'-trimethyleneisobutylamidine), 2,2'-azobis(N,N'-tetramethyleneisobutylamidine), 2,2'-azobis(N,N'-pentamethyleneisobutylamidine), 2,2'-azobis(N,N'trimethylene-2,4-dimethylpentylamidine), 2,2'-azobis(N,N'-trimethylene-2-cyclopropylpropioamidine), 2,2'-azobis(N,N'-trimethyleneisoheptylamidine), 2,2'-azobis(N,N'-tetramethyleneisopentylamidine), 2,2'-azobis(N,N'-tetramethylene-2-methyl-3-cyclopropylpropionamidine), 2,2'-azobis(N,N'-pentamethyleneisobutylamidine), 2,2'-azobis(N,N'-trimethylene-2-cyclopropylpropioamidine) and the like and acid addition salts thereof. As acids for forming acid addition salts of these azo compounds, there can be used mineral acids such as hydrochloric acid, sulfuric acid, etc. and organic acids such as acetic acid, propionic acid, benzoic acid, etc. There can also be used 2,2'-azobis-2-methyl-3-methoxy-3-iminopropane, 2,2'-azobis-2-methyl-3-ethoxy-3-iminopropane, 2,2'-azobis-2-methyl-3-propoxy-3-iminopropane, 2,2'-azobis-2-methyl-3-isobutoxy-3-iminopropane, 2,2'-azobis-2-methyl-3-cetyloxy-3-iminopropane, 2,2'-azobis-2-methyl-3-phenoxy-3-iminopropane, and the like and acid addition salts thereof. In addition to these azo compounds, there can also be used azobisisobutyronitrile, azobis-2,4-dimethylvaleronitrile, 4,4'-azobis(4-cyanovaleric acid) and their salts such as sodium or ammonium salt. Among them, 2,2'-azobis(2-amindinopropane) and its acid addition salts and 4,4'-azobis(4-cyanovaleric acid) and its salts such as sodium or ammonium salt are preferable.

As the water-soluble monomer producing water-soluble polymer, there can be used monomers which are soluble in at least water or other monomers which can be dissolved in an aqueous solution of such a water-soluble monomer. Examples of these monomers are acrylic acid or its salts such as sodium or ammonium salts, methacrylic acid and its salts such as sodium or ammonium salts, acrylamide, methacrylamide; hydroxyalkyl esters such as hydroxyethyl ester of acrylic or methacrylic acid; aminoalcohol esters such as dimethylaminoethanol ester, diethylaminoethanol ester or diethylaminopropanol ester of acrylic or methacrylic acid and their salts such as their quaternary ammonium salts; alkyl esters such as methyl, ethyl, n-butyl, and the like esters of acrylic or methacrylic acid. In addition, there can also be used vinyl alkyl ethers such as vinyl methyl ether, vinyl ethyl ether, and the like; vinylsulfonic acids such as vinylsulfonic acid, allylsulfonic acid and their salts such as sodium and ammonium salts, vinylpyrrolidone, vinylpyridine, diacetone acrylamide, N-methylolacrylamide, acrylonitrile, vinyl acetate, and the like. Among them, acrylic acid, methacrylic acid, acrylamide, methacrylamide are preferable.

These water-soluble monomers can be used alone or as a mixture of two or more of them.

Polymerization of the water-soluble monomer can be carried out under conventional polymerization conditions. For example, in the case of polymerization in an aqueous solution, oxygen in the polymerization system is replaced by an inert gas such as nitrogen gas, carbon dioxide, or the like. The monomer is usually used as an aqueous solution containing 5 to 30% by weight of the monomer. As the initiator, ADIA or its acid addition salt is usually used in an amount of 0.0001 to 1.0% by weight based on the weight of the monomer. As the initiator, when ADIA or acid addition salt is used together with one or more another azo compounds, the quantities of the individual components of the initiator will be varied according to the materials used and process conditions. The mixture of ADIA or its acid addition salt and another azo compound is usually used in an amount of 0.0001 to 1.0% by weight based on the weight of the monomer. It is preferable to use ADIA or its acid addition salt in an amount of 10% or more based on the total weight of the initiator. Initial temperature of polymerization is usually from room temperature to about 50° C.

The process of this invention can be applied not only to polymerization in an aqueous solution but also to emulsion polymerization, or counter phase (water phase/oil phase) suspension polymerization for producing water-soluble polymers.

The water-soluble polymers thus produced, particularly acrylamide series polymers, show excellent properties comparing with those obtained by using redox initiators. That is, since ADIA or its acid addition salt has fast decomposition rate, the polymerization can be initiated without using redox initiators. This means that defects caused by using the redox initiators such as formation of crosslinking, and induced decomposition of the reducing agent which results in discontinuing of effect of the initiator and retaining unreacted monomer in the polymer produced can be overcome. Further, the use of ADIA or its acid addition salt alone or together with another azo compound can produce water-soluble polymers such as polyacrylamide having high molecular weight with a small amount of branching and good water solubility and showing excellent effects as flocculating agent.

Further, conventional water-soluble polymers such as polyacrylamide produced by using redox initiators change their properties considerably when stored in a dilute solution for a long period of time, although causes and mechanisms are not known, which results in reducing their effects when applied to various usages. On the contrary, the water-soluble polymer such as polyacrylamide obtained by the process of this invention by using ADIA or its acid addition salt as initiator changes its properties very little under the same conditions as mentioned above. Table 1 below shows changes in effects of polyacrylamide produced according to the process of this invention and that according to a conventional process using redox initiators when used as flocculating agent with the lapse of time. Aqueous solutions of polyacrylamide in concentrations as listed in Table 1 were stored in an incubator heated at 40° C. To a 5% by weight kaolin aqueous suspension, 2.5 ppm of the polyacrylamide solution was added and tested. Effects of polyacrylamide, i.e. sedimentation rate (cm/min) with the lapse of time are compared and ratios to the value of the initial date (0 day passed), the value at the initial date being 100%, are listed in Table 1.

TABLE 1

| Initiator | Concentration of polyacrylamide in an aqueous solution (%) | Effects (%) Days passed | | | |
|---|---|---|---|---|---|
| | | 0 | 1 | 3 | 5 |
| 2,2'-Azobis(N,N'-dimethylene-isobutyramidine hydrochloride | 0.01 | 100 | 100 | 92.1 | 83.3 |
| | 0.1 | 100 | 100 | 97.0 | 95.5 |
| Potassium persulfate and Mohr's salt | 0.01 | 100 | 100 | 88.0 | 69.3 |
| | 0.1 | 100 | 100 | 86.6 | 66.7 |

This invention is illustrated by way of the following examples in which all parts and percents are by weight unless otherwise specified.

EXAMPLES 1-3, COMPARATIVE EXAMPLES 1-2

In a reactor equipped with a stirrer, 5 parts of acrylamide and 75 parts of distilled water were placed to dissolve the former. Subsequently, a prescribed amount of a polymerization initiator as listed in Table 2 was added to the reactor and polymerization was carried out under the conditions as listed in Table 2 with stirring under nitrogen stream. The resulting viscous solution was dried on a double drum drier to give dried white scales.

For comparison, the same procedure a mentiond above except for using conventional redox initiators in place of ADIA hydrochloride was repeated under the conditions as listed in Table 2 (Comparative Examples 1 and 2).

The results were as listed in Table 2. In Table 2, intrinsic viscosity was measured by using an Ubbelohde viscometer.

TABLE 2

| Example No. | Initiator | | Polymerization | | Conversion (%) | Intrinsic viscosity (at 25° C.) |
|---|---|---|---|---|---|---|
| | Kind | Amount (part) | Temp. (°C.) | Time (hrs) | | |
| Example 1 | ADIA . HCl | 0.002 | 50 | 3 | 99.8 | 11.2 |
| Example 2 | ADIA . HCl | 0.003 | 30 | 8 | 99.3 | 11.4 |
| Example 3 | ADIA . HCl 2,2'-Azobis(2-amidinopropane) . HCl | 0.002 0.001 | 50 | 3 | 99.9 | 11.1 |
| Comparative Example 1 | Potassium persulfate Mohr's salt | 0.002 0.001 | 50 | 10 | 90.5 | 6.8 |

TABLE 2-continued

| Example No. | Initiator Kind | Amount (part) | Polymerization Temp. (°C.) | Time (hrs) | Conversion (%) | Intrinsic viscosity (at 25° C.) |
|---|---|---|---|---|---|---|
| Comparative Example 2 | Potassium persulfate Mohr's salt | 0.002 0.001 | 45 | 15 | 92.0 | 7.1 |

Referential Example

In a 50-ml sedimentation test tube having an inner diameter of 2 cm and a ground-glass stopper, 47.5 ml of a solution to be tested as listed in Table 3 was placed and shaken sufficiently to give a suspension. To the suspension, 2.5 ml of each polymer as listed in Table 4 obtained in Examples 1-3 and Comparative Examples 1-2 in a concentration as listed in Table 5 was added. Then the resulting solution was mixed by inverting 10 times and then allowed to stand to measure flocculation effect.

The results were as shown in Table 5.

In Table 5, transmittance was obtained by measuring a value of a supernatant liquid after standing for 15 minutes at 600 nm and compared with that of water (100%).

TABLE 3

|  | Suspended particle | Concentration of suspended matter |
|---|---|---|
| Solution to be tested (I) | Kaolin | 5% |
| Solution to be tested (II) | Filter cell | 5% |

TABLE 4

| Polymer solution | Polymer |
|---|---|
| A | Obtained in Example 1 |
| B | Obtained in Example 2 |
| C | Obtained in Example 3 |
| D | Obtained in Comparative Example 1 |
| E | Obtained in Comparative Example 2 |

TABLE 5

| Solution to be tested | Polymer solution Kind | Concentration (%) | Sedimentation rate (cm/min) | Transmittance (%) | Size of floc produced (mm) |
|---|---|---|---|---|---|
| I | A | 0.005 | 23.3 | 98 | 2.1–3.0 |
|  | B | " | 25.1 | 98 | 2.0–3.1 |
|  | C | " | 25.8 | 98 | 2.1–3.0 |
|  | D | " | 7.3 | 97 | 0.9–1.5 |
|  | E | " | 9.0 | 97 | 1.0–1.5 |
| II | A | 0.01 | 2.7 | 88 | 0.3–0.5 |
|  | B | " | 2.9 | 87 | 0.3–0.5 |
|  | C | " | 3.0 | 89 | 0.3–0.5 |
|  | D | " | 1.2 | 46 | <0.3 |
|  | E | " | 1.0 | 48 | <0.3 |

As is clear from Table 5, the acrylamide polymers obtained by the process of this invention are remarkably superior to those obtained by the conventional method in flocculation effect such as sediumentation rate and transmittance.

EXAMPLE 4

In the same reactor as used in Example 1, 3 parts of acrylamide, 1 parts of acrylic acid and 70.4 parts of distilled water were placed and dissolved. Subsequently, 0.002 part of ADIA.HCl and 0.001 part of 4,4'-azobis(4-cyanovaleric acid.Na salt) were added as initiator to the reactor. After reacting at 40° C. for 5 hours with stirring under nitrogen stream, 5.6 parts of a 10% NaOH solution was added to neutralize the product to give a colorless clear viscous solution with conversion of 97.5%. After dried, a viscosity of a 1% aqueous uniform solution of the resulting polymer was 6900 cps measured at 25° C.

EXAMPLE 5

In the same reactor as used in Example 1, 1 part of acrylamide, 3 parts of dimethylamino ethyl methacrylate quaternary ammonium salt obtained by using hydrochloric acid and 76 parts of distilled water were placed and dissolved. Subsequently, 0.002 part of ADIA.HCl was added to the reactor as initiator, and the resulting mixture used adjusted to pH 3 with sulfuric acid. After reacting at 40° C. for 5 hours with stirring under nitrogen stream, there was obtained a colorless clear viscous solution in 98.8% conversion. A viscosity of a 1% aqueous uniform solution of the resulting polymer after dried was 165 cps measured at 25° C.

EXAMPLE 6

In the same reactor as used in Example 1, 15 parts of acrylamide, and 65 parts of distilled water were placed and dissolved. The oxygen dissolved in the water was removed sufficiently by introducing nitrogen. Subsequently, 0.0015 part of ADIA.HCl and 0.0015 part of 2,2'-azobis(2-amidinopropane).hydrochloride were added to the reactor as initiator and polymerization was started at 30° C. The polymerization was continued for 6 hours while left at rest to give a colorless clear gel-like polymer in 99.9% conversion. The final temperature in the reactor was 79° C. A viscosity of 1% aqueous uniform solution of the resulting polymer after dried was 1300 cps measured at 25° C. by using a Brookfield type rotary viscometer.

Comparative Example 3

The procedure of Example 6 was repeated except for using 0.002 part of ammonium persulfate and 0.001 part of sodium sulfite as initiator to give a colorless clear gel-like polymer in 96.5% conversion. The final temperature in the reactor was 72° C. A viscosity of 1% aqueous solution of the resulting polymer after dried, although insoluble gel being retained partly, was 420 cps, which was lower than that of Example 7.

What is claimed is:

1. A process for producing a water-soluble polymer which comprises polymerizing a water-soluble monomer by using as a polymerization initiator 2,2'-azobis(N,N'-dimethyleneisobutyramidine) or an acid addition salt thereof or a mixture of 2,2'-azobis(N,N'-dimethyleneisobutyramidine) or an acid addition salt thereof and another azo compound, said polymerization being initiated at an initial polymerization temperature of from 30° C. to 50° C.

2. A process according to claim 1, wherein the another azo compound is 2,2'-azobis(2-amidinopropane) or an acid addition salt thereof.

3. A process according to claim 1, wherein the another azo compound is 4,4'-azobis(4-cyanovaleric acid) or a salt thereof.

4. A process according to claim 1, wherein the water-soluble monomer is acrylic acid, methacrylic acid, acrylamide, methacrylamide, an acrylic or methacrylic aminoalcohol ester or its quaternary ammonium salt, or a mixture thereof.

5. A process according to claim 1, 2 or 3, wherein the water soluble monomer is acrylamide.

* * * * *